United States Patent [19]

Schwarzler et al.

[11] 3,797,403
[45] Mar. 19, 1974

[54] POWER ELECTROMAGNETIC SUSPENSION AND GUIDE SYSTEM FOR VEHICLES

[75] Inventors: Peter Schwarzler, Furstenfeldbruck; Gerhard Bohn; Helmut Schauberger, both of Munich, all of Germany

[73] Assignee: Krauss-Maffei Aktiengesellschaft, Munich, Germany

[22] Filed: June 30, 1972

[21] Appl. No.: 268,133

[30] Foreign Application Priority Data
July 9, 1971   Germany............................ 2134425

[52] U.S. Cl............................. 104.148 MS, 317/123
[51] Int. Cl............................................... B61b 13/08
[58] Field of Search................ 104/148 MS, 148 SS; 308/10; 317/123

[56] References Cited
UNITED STATES PATENTS
3,112,962   12/1963   Lautzenhiser......................... 308/10
3,124,962   3/1964   Hirtreiter............................... 308/10
3,090,239   5/1963   Dacas..................................... 308/10

FOREIGN PATENTS OR APPLICATIONS
707,032   5/1941   Germany...................... 104/148 MS Primary Examiner—Robert G. Sheridan
Assistant Examiner—George H. Libman
Attorney, Agent, or Firm—Karl F. Ross; Herbert Dubno

[57] ABSTRACT

An electromagnetic suspension and drive system, e.g., for a floating personnel carrier or other vehicle, wherein a T-section armature is carried by the vehicle and is provided along its shank with a magnetic suspending coil and along the crossbar of the T with a pair of magnetic guide coils and connected and arranged through the latter coils provided oppositely effective horizontal forces and operate in aiding relationship with the suspending coil. The magnetic flux path is closed through a U-shaped channel whose flanges flank the crossbar of the T and receive the armature between them while defining lateral and vertical air gaps with the armature.

9 Claims, 4 Drawing Figures

3,797,403

POWER ELECTROMAGNETIC SUSPENSION AND GUIDE SYSTEM FOR VEHICLES

SPECIFICATION

1. Field of the Invention

The present invention relates to magnetic suspension guide and drive arrangements for floating vehicles and, more particularly, to improvements in the magnetic supporting and guiding systems of personnel-carrying vehicles operated by linear-induction motors or some power source free from frictional engagement with the track along which the vehicle is displaced.

2. Background of the Invention

In recent years considerable interest has been manifested in mass transportation systems free from disadvantages of prior existing systems using frictional engagement between the vehicle body and a track. Prior-art systems of the friction-drive type may use a monorail or a double-rail support for a vehicle provided with wheels or the like rollingly engaging the track and driven by an electric motor, internal-combustion engine or some other friction drive source. In still other arrangements, a more positive engagement is provided between the vehicle and the track by cables, chains or cog wheels. All of these systems have the disadvantage that friction limits speed and a friction drive requires application of force against the track, thereby generating considerable noise. Furthermore, wear of the track or of the drive means constitutes a major problem which is only ameliorated by the use of improved bearings, rubber-covered wheels or coated supporting tracks.

More recently there have been proposed various propulsion techniques which avoid some of the above disadvantages, the technique of principal interest for the present invention being that of linear-induction motors. In this system, an electromagnetic arrangement on the vehicle (or on the track) can interact with the other member of the system to induce propulsion along the track by magnetic force. In wheeled vehicles, such systems have only limited advantage since they do not overcome the wear and noise generation produced by engagement of the wheel with the track. To limit such friction forces and the disadvantages thereof, whether the drive is a linear induction motor of pneumatic propulsion of some type, e.g. by creating a pressure differential across the vehicle, it has been proposed to suspend the vehicle from the "track" and to maintain an airgap between the supporting surfaces of the vehicle and the right of way thereof. One technique which provides this floating support of the vehicle is the air cushion whereby air is forced under pressure into a narrow gap between confronting surfaces of the track and of the vehicle. This system has the disadvantage that high volumes of air must be displaced and the pumps, propellers and fans necessary for this purpose generate considerable amounts of noise. Hence attention has been directed to systems in which a gap between the supported vehicle and the supporting structure is maintained by electromagnetic forces. The present invention is directed to a system of the latter type and the term "track" is used to refer to the supporting member of the transportation system along which the vehicle is propelled, preferably by a linear-induction motor although other nonfriction propulsion sources, e.g. air-displacement and pressure-differential systems may also be used.

It has been the practice heretofore, in vehicle arrangements which are supported and guided by electromagnetic means, to provide an electromagnetic coil and armature creating vertical force fields for suspending the vehicle from the support or track and a pair of additional electromagnetic coils with respective armatures for generating horizontally directed force fields for maintaining the vehicle in its proper channel along the track, i.e., for laterally guiding the vehicle. Since each of the magnets acted substantially independently via a respective armature, the suspension and guide assembly was relatively complex. At least one such assembly was generally provided to each side of a vertical median plane through the vehicle and its track for maximum stability against roll while a number of such assemblies were provided in line with one another in the direction of movement of the vehicle to limit yaw and to permit larger vehicles to be employed. In each case, the complexity of the individual assembly and its manufacturing cost contributed significantly to the cost of the transportation system and often rendered the latter uneconomical.

The invention thus deals with the electromagnetic suspension and guide systems for free-floating vehicles which are suspended from or supported upon a track defining the vehicle path and providing the necessary vertical sources holding the vehicle out of contact with the path and the lateral forces guiding the vehicle therealong.

Another disadvantage of the multiple magnet + multiple core or armature system of each suspension and guide arrangement has been the relatively high cost of the magnets and cores and the considerable mass of the latter which reduces the useful load or capacity of the vehicle.

3. OBJECTS OF THE INVENTION

It is, therefore, the principal object of the present invention to provide an improved suspension and guide arrangement for an electromagnetically supported vehicle (more generally, a free-floating suspended vehicle).

Another object of the invention is to provide a suspension and magnetic guide arrangement for such vehicles whereby the prior-art disadvantages can be obviated, the cost and weight of this system can be reduced for a given useful load or the useful load can be increased for a given mass of the suspension and guide system.

Yet another object of the invention is to provide an electromagnetic guide and system, especially for floating personnel carriers displaceable along a track (e.g. as in aerial tramways) in which the weight carried by the suspended vehicle can be reduced for a given suspension force, and both the quantity of material and the cost of the system can be diminished.

4. SUMMARY OF THE INVENTION

These objects and others which will become apparent hereinafter are attained, in accordance with the present invention, with a suspension and guide system of the electromagnetic type and for the purposes described which comprises a single magnetic armature mounted upon the track and preferably of inverted U-section or channel configuration, between the flanges and within the channel of which is received an inverted T-section magnetic core provided with a coil along its vertical shank and a pair of coils along its horizontal arms (the latter forming the crossbar of the T) electrically connected and magnetically arranged so that the shank electromagnet generating the vertically effective force causes attraction of the respective lateral poles or arms of the core to the flanges of the channel in opposite directions; the electromagnets along the crossbar of the T are selectively energized to provide a flux addition in one of the horizontal gaps and flux subtraction at the other to compensate for any externally applied forces which may tend to reduce the size of one of the gaps and increase the size of the other. Such lateral forces may be centrifugal force produced as the vehicle travels around a curve or the forces resulting from wind against the vehicle.

In more general terms, the invention comprises an electromagnetic suspension for a floating suspended vehicle, such as an aerial tramway, in which the magnet has a vertical shank and a crossbar extending from this shank and is received within a U-section or channeled armature or yoke such that the flux produced by a coil on the shank splits at the armature or yoke and is returned through the crossbar, a vertical flux extending through the gap between the shank and the web or base of the channel. This flux produces the vertical or suspension force. Substantially horizontal flux paths are provided across horizontal gaps between the ends of the crossbar and the flanges of the channel and to generate magnetic attractive forces operating in opposite directions and normally maintaining the electromagnet (and thus the vehicle) in a median position in which the algebraic resultant of the magnetically supplied horizontal force upon the vehicle is zero. The electromagnet is provided with coil means, preferably in the form of coils upon the crossbar, which is energizable independently of the first-mentioned coil to generate a flux which is additive in one horizontal gap and is subtractive in the other. The first-mentioned electromagnetic coil, therefore, provides both suspending and horizontal guide forces.

The separate energizability of the electromagnets, which are effective in the horizontal and vertical directions, in combination with the three air gaps of a single magnetic core, allows the use of a single armature, yoke or rail for the electromagnet or row of electromagnets on each side of the vehicle. Of course, for vehicles of larger size additional sets of electromagnets and rails may be required, although in each case, the number of electromagnets will be less than that required in conventional systems.

The vertically effective electromagnet, preferably mounted on the shank of the inverted T, provides the basic suspension force necessary to support the vehicle as well as a normally balanced set of horizontal forces providing lateral guidance. The result is a metastable equilibrium which can be adversely affected by the application of lateral force components to the vehicle as described above. According to the invention, however, these lateral components are balanced or resisted by the energization of the horizontally effective electromagnets which act in flux-addition or flux-subtraction at the horizontal gaps. The forces generated by these horizontally effective magnets tend to urge the vehicle into its median or normal position.

The coils upon the crossbars or horizontal arms of the inverted T preferably have identical numbers of turns and the same winding sense so that they can be energized in series. The free ends of the arms and shanks of the inverted T may be provided with pole shoes to increase the magnetic flux concentration at the gaps and it has been found to be advantageous to permit the shoes or some other pole-forming parts of the electromagnet to extend beneath the lower ends of the flanges so that any downward movement of the electromagnet will induce an upward magnetic-force component at the horizontal gaps as well.

5. DESCRIPTION OF THE DRAWING

The above and other objects, features and advantages of the present invention will become more readily apparent from the following description, reference being made to the accompanying drawing in which.

6. SPECIFIC DESCRIPTION

Figure 1:
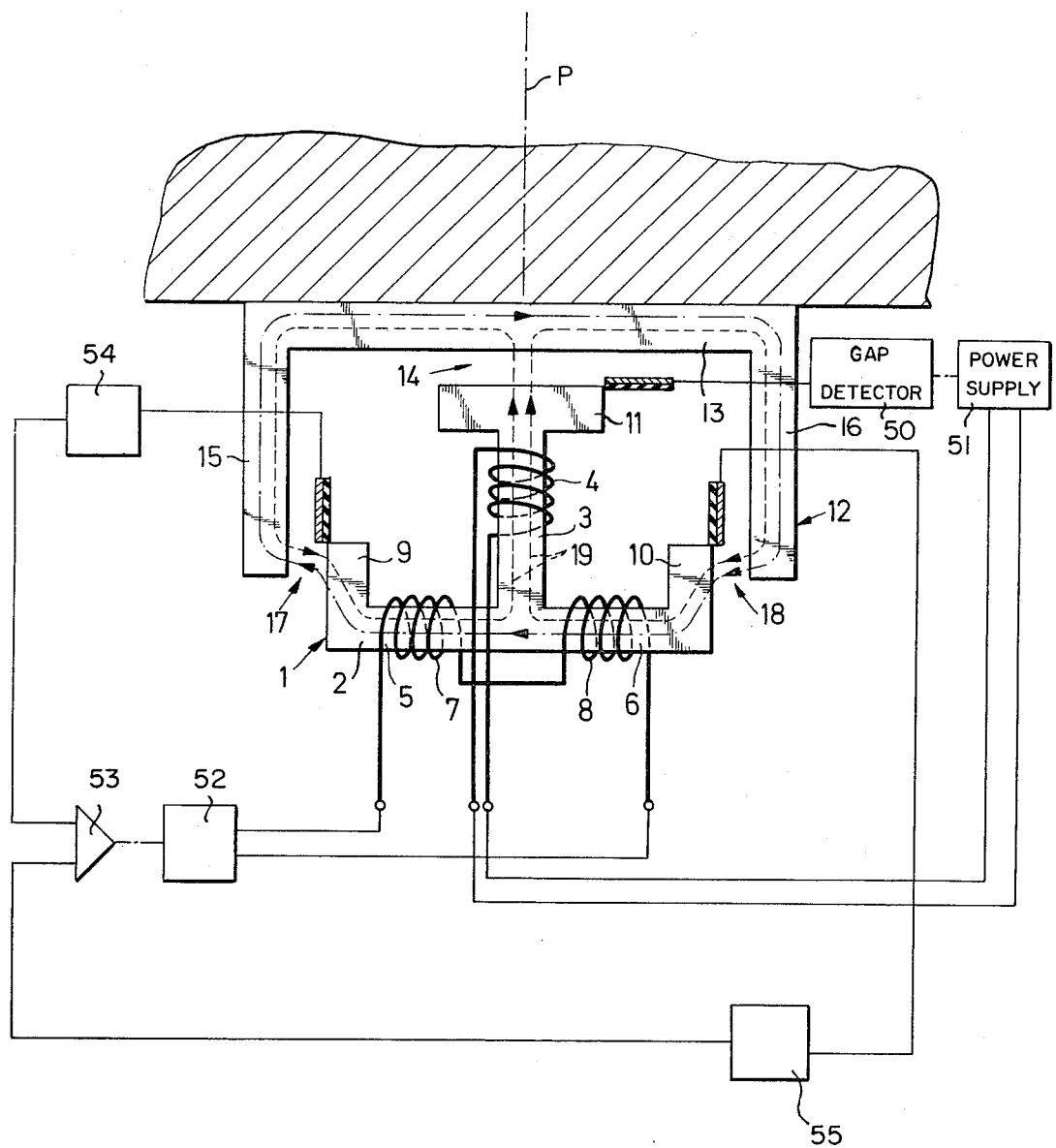
FIG. 1 is a cross-sectional view, partly in diagrammatical form, of an electromagnet and armature system for suspending a vehicle according to the present invention.
Figure 2:
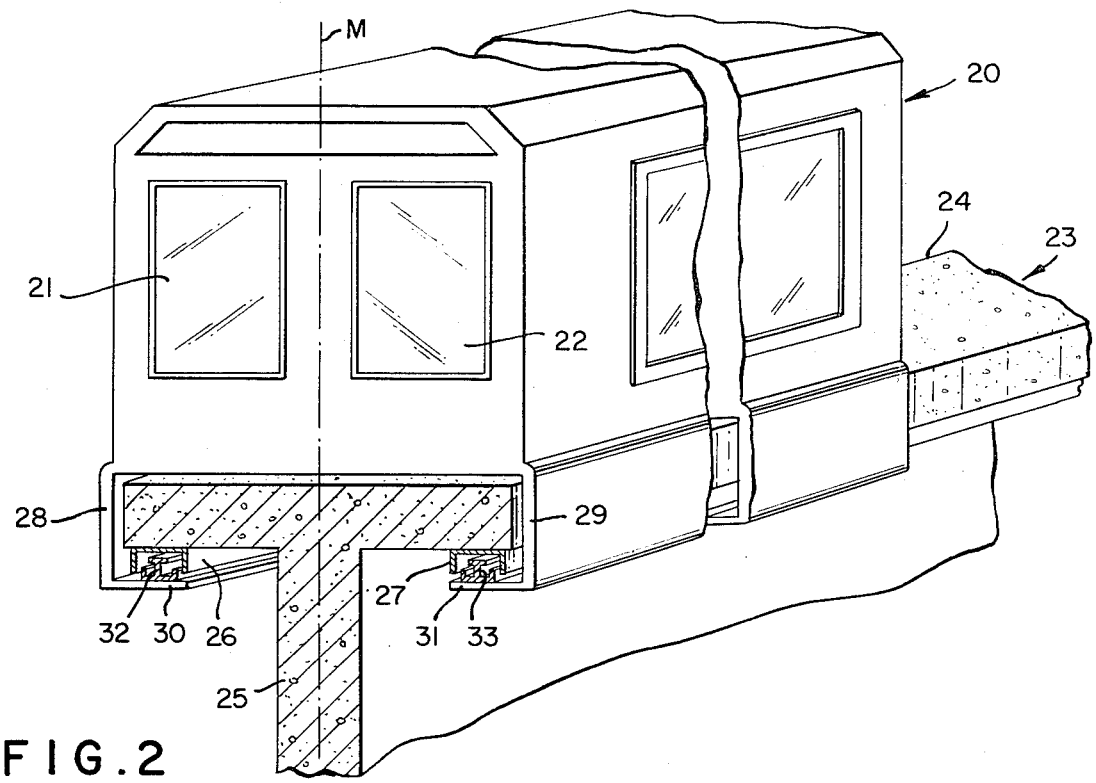
FIG. 2 is a diagrammatic perspective view, partly broken away, showing the application of the system to a vehicle.

The vehicle illustrated diagrammatically in FIG. 2 comprises a personnel-carrying cab 20 with a compartment 21 for a vehicle operator and a compartment 22 for persons to be carried by the vehicle along a track defined by a concrete strucure 23. The latter consists of a generally horizontal support 24 and uprights or posts 25 spaced therealong, the track having a T-section at the posts. Along the undersides of the support 24 there are provided a pair of downwardly open magnetically permeable (iron) channels 26 and 27 symmetrical above a median plane M of the transport system. The vehicle 20 is provided with a pair of aprons 28 and 29 which are formed with inwardly turned flanges 30 and 31 each carrying at least two spaced-apart electromagnets 32 or 33 in the direction of travel of the vehicle. The electromagnets 32 and 33 are each of the type described in connection with FIG. 1 or in connection with FIGS. 3 and 4. The electromagnets suspend the vehicle 20 from the track, the vehicle being driven by a linear-induction motor or some other, preferably frictionless, drive means.

The electromagnet shown in FIG. 1 and designated generally at 1 comprises an inverted-T-shaped core 2 whose central shank 3 lies in a vertical plane P between the flanges 15 and 16 of the armature as will be described in greater detail hereinafter, when the vehicle is in its median position.

The shank 3 carries a coil 4 and terminates at a crossbar consisting of transverse arms 5 and 6 each of which is provided with a coil 7 or 8. The coils 7 and 8 have identical numbers of turns and are of the same winding sense while being connected electrically in series.

Figure 3:
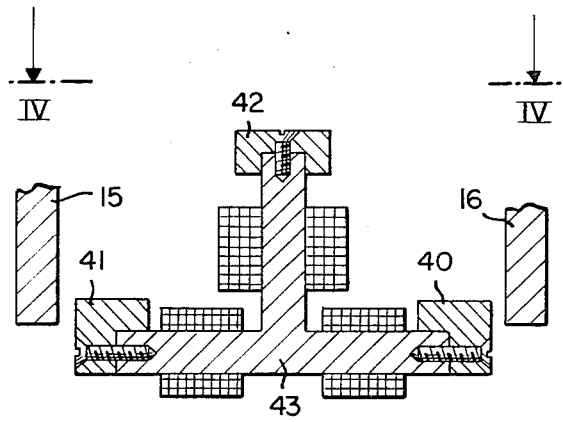
FIG. 3 is a view similar to FIG. 1 of another electromagnet according to the invention.

The extremities of the shank 3 and arms 5 and 6 are angled to parallel the juxtaposed surfaces of the armature and can be considered to be pole shoes 9, 10 and 11. In the system of FIG. 3, pole shoes 40, 41 and 42 are connected by bolts to the core 43 and a similar pole-shoe construction may be used here as well.

The magnet 1 is freely suspended at least in part within the fixed armature 12 which is of downwardly opened U-profile to constitute a channel. The horizontal shoe 11 of the shank 3 defines an air gap 14 with the web 13 of the channel while the vertical faces 9 and 10 of the arms 5 and 6 of the electromagnet define air gaps 17 and 18 with the flanges 15 and 16 of the channel. These shoes 9 and 10, moreover, extend below the ends of the flanges 15 and 16 so that a vertical-force component is generated at the horizontal air gaps as well.

When the coil 4 is energized, it produces a flux represented by the broken line 19 extending through the air gap 14, splitting at the web 13 of the channel and closing through the arms 5 and 6 of the core and passing in opposite directions through the air gaps 17 and 18. A contactless gap detector 50 may be connected with the core 1 to produce a signal representing deviation of the gap width from an optimum and may automatically energize the power supply 51 for feeding the coil 4. A servomechanism for maintaining the gap width in this manner can be any of the type heretofore provided for this purpose in magnetically suspended vehicles or for maintaining the gap in electric-discharge machining processes.

The horizontal force components generated by coil 4 are equal and opposite and urge the core 2 and, therefore, the vehicle into its normal medium position. However, should a lateral force be applied to the vehicle, the core will approach one of the flanges and move away from the other, thereby destroying the metastable equilibrium. To avoid this and compensate for such dislocating forces, the coils 7 and 8 are energized, e.g. to provide a flux subtraction in the gap 17 and a flux addition in the gap 18, thereby shifting the core 2 to the right against the lateral force assumed to be in the opposite direction. The coils 7 and 8 are energized in series from a source 52 controlled by a differential amplifier 53 receiving inputs from gap detectors 54 and 55 responsive, respectively, to the gap widths 17 and 18.

Figure 4:
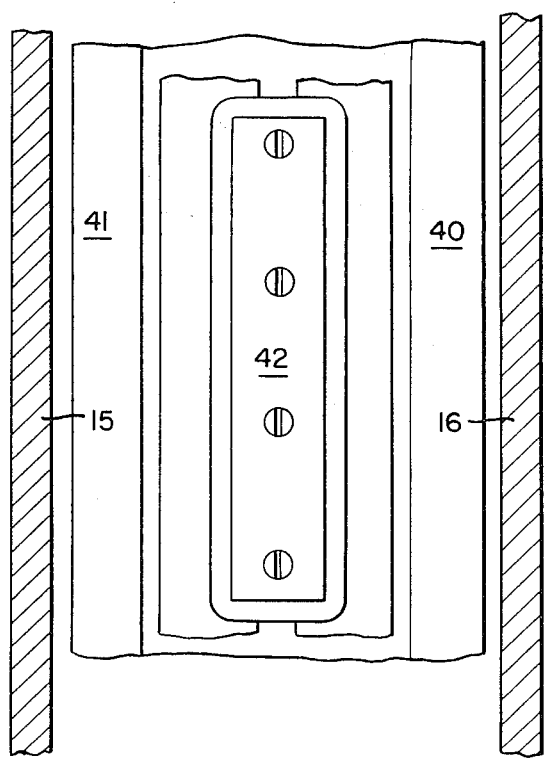
FIG. 4 is a view taken along the line IV—IV of FIG. 3.

In FIGS. 3 and 4, we show a modified system having separate pole shoes but otherwise operating in the manner described. It is important to the present invention that the plane $P_2$ of the lower ends of the pole shoes 40 and 41 lie beneath the plane $P_1$ of the lower end of the flanges 15 and 16.

We claim:
1. An electromagnetic suspension and guide system comprising:
   a longitudinally extending fixed support;
   a floating body displaceable longitudinally along said support;
   an armature rail extending along said fixed support and connected thereto; and
   an electromagnet on said body juxtaposed with said armature rail and including a core and electromagnet coil means on said core for producing a vertical-suspension and lateral-guide flux and, independently thereof, for selectively augmenting and diminishing said lateral-guide flux, said armature rail being a channel having a base and a pair of vertically extending flanges connected to said base, said core having a generally T-shaped profile with a shank extending vertically toward said base and a pair of arms extending laterally toward said flanges to define a vertical air gap between said shank and said base and a pair of horizontal air gaps between said arms and said flanges, said coil means including a first coil on said shank and a second coil on at least one of said arms, said first coil being energizable to generate a vertical-suspension magnetic force at said vertical gap and oppositely effectively horizontally guide forces at said horizontal gaps, said second coil being energizable to modify said horizontal forces.

2. The system defined in claim 1 wherein each of said arms is provided with respective second coils, said second coils having identical numbers of turns and the same winding sense and being electrically connected in series.

3. The system defined in claim 2 wherein said shanks and said arms at their free ends are provided with respective pole shoes.

4. The system defined in claim 2 wherein the free ends of said arms lie at least in part below the bottoms of said flanges.

5. The system defined in claim 4 wherein said support is a horizontally extending track provided along its underside with a pair of symmetrically disposed armature rails as defined and said body is a vehicle displaceable along said track and provided with a pair of such electromagnets each cooperating with one of said armature rails.

6. The system defined in claim 5 further comprising means responsive to the widths of said horizontal gaps for energizing said second coils.

7. An electromagnetic suspension and guide system comprising a longitudinally extending fixed support;
   a floating body displaceable longitudinally along said support;
   an armature rail extending along said fixed support and connected thereto;
   an electromagnetic core on said body juxtaposed with said armature rail and defining at least one air gap with said core and generating vertical electromagnetic force between said rail and said core, and at least two air gaps between said core and said armature rail for developing oppositely acting electromagnetic forces in substantially horizontal directions between said core and said rail; and
   electromagnetic coil means on said core including at least one first portion for generating magnetic flux in said core across said one air gap and at least two portions cooperating with said two air gaps respectively and providing in dependence upon relative horizontal displacement forces of said core and said rail, a flux addition in one of the two portions and a flux subtraction in the other of the two portions.

8. The system defined in claim 7 wherein said armature rail is generally of a U section having a horizontal web and a pair of vertically extending shanks depending from said web, said core being of inverted-T configuration with the shank of said T being juxtaposed with said web to form said one gap and each laterally extending arm of the T being juxtaposed with a respective shank to form a respective one of said two gaps.

9. The system defined in claim 8 wherein said one portion is a coil portion wound on said shank and said two portions are respective coil portions wound on said arms.

* * * * *